United States Patent
Zimmermann et al.

(10) Patent No.: US 11,414,062 B2
(45) Date of Patent: Aug. 16, 2022

(54) BRAKE SYSTEM AND METHOD FOR OPERATING SUCH A BRAKE SYSTEM

(71) Applicant: Continental Teves AG & Co. oHG, Frankfurt am Main (DE)

(72) Inventors: Jochen Zimmermann, Frankfurt am Main (DE); Robert Grimm, Frankfurt am Main (DE)

(73) Assignee: CONTINENTAL TEVES AG & CO. OHG, Frankfurt am Main (DE)

( * ) Notice: Subject to any disclaimer, the term of this patent is extended or adjusted under 35 U.S.C. 154(b) by 93 days.

(21) Appl. No.: 16/757,932

(22) PCT Filed: Oct. 22, 2018

(86) PCT No.: PCT/EP2018/078859
§ 371 (c)(1),
(2) Date: Apr. 21, 2020

(87) PCT Pub. No.: WO2019/081414
PCT Pub. Date: May 2, 2019

(65) Prior Publication Data
US 2021/0188237 A1    Jun. 24, 2021

(30) Foreign Application Priority Data

Oct. 24, 2017   (DE) .................... 10 2017 219 000.0

(51) Int. Cl.
*B60T 13/74*        (2006.01)
*B60T 13/68*        (2006.01)
(Continued)

(52) U.S. Cl.
CPC ............ *B60T 13/686* (2013.01); *B60T 7/042* (2013.01); *B60T 13/662* (2013.01); *B60T 13/745* (2013.01);
(Continued)

(58) Field of Classification Search
CPC ............ B60T 13/745; B60T 2270/402; B60T 2270/404; B60T 2270/412; B60T 13/686
See application file for complete search history.

(56) References Cited

U.S. PATENT DOCUMENTS 6,209,966 B1    4/2001  Mies
6,299,261 B1 *  10/2001 Weiberle ................. B60T 8/885
                                                 303/122.04
(Continued)

FOREIGN PATENT DOCUMENTS

CN      105473396 A     4/2016
CN      105916746 A     8/2016
(Continued)

OTHER PUBLICATIONS

Machine translation of DE 10 2013 217 954, retrieved Sep. 29, 2021 (Year: 2021).*

(Continued)

*Primary Examiner* — Bradley T King
(74) *Attorney, Agent, or Firm* — RatnerPrestia

(57) ABSTRACT

A brake system for a motor vehicle with at least four hydraulically activated wheel brakes. Each of the wheel brakes has a first electrically activated wheel valve which is open when de-energized and a second electrically activated wheel valve which is closed when de-energized, a first electrically activated pressure source, connected to the first wheel valves via a first brake supply line. Arranged in the first brake supply line is an electrically activated circuit isolating valve by which two of the first wheel valves can be hydraulically disconnected from the first pressure source, a second electrically activated pressure source, and a pressure medium reservoir vessel at atmospheric pressure. The circuit isolating valve is designed to be open when de-energized, and the second electrically activated pressure source is (Continued)

connected to the second wheel valves via a second brake supply line. A method for operating the brake system is also disclosed.

16 Claims, 1 Drawing Sheet

(51) Int. Cl.
*B60T 7/04* (2006.01)
*B60T 13/66* (2006.01)

(52) U.S. Cl.
CPC ... *B60Y 2400/3032* (2013.01); *B60Y 2400/81* (2013.01)

(56) References Cited

U.S. PATENT DOCUMENTS

| | | | |
|---|---|---|---|
| 9,096,206 | B2 | 8/2015 | Linkenbach et al. |
| 9,776,607 | B2 | 10/2017 | Brenn et al. |
| 9,834,188 | B2 | 12/2017 | Feigel |
| 10,065,613 | B2 | 9/2018 | Linhoff et al. |
| 11,066,055 | B2* | 7/2021 | Besier ................ B60T 8/4077 |
| 2002/0050739 | A1* | 5/2002 | Koepff .................. B60T 8/348 303/122.09 |
| 2011/0248558 | A1* | 10/2011 | Vollert .................... B60T 1/10 303/3 |
| 2013/0147259 | A1* | 6/2013 | Linkenbach .......... B60T 13/745 303/14 |
| 2014/0028083 | A1* | 1/2014 | Gerdes ................ B60T 8/4077 303/6.01 |
| 2014/0152085 | A1* | 6/2014 | Biller .................... B60T 8/441 303/10 |
| 2015/0175477 | A1 | 6/2015 | Zhao et al. |
| 2016/0009263 | A1* | 1/2016 | Feigel .................... B60T 8/321 303/15 |
| 2016/0009267 | A1 | 1/2016 | Lesinski |
| 2016/0023644 | A1* | 1/2016 | Feigel .................. B60T 13/147 303/3 |
| 2016/0167632 | A1 | 6/2016 | Deng et al. |
| 2016/0200307 | A1 | 7/2016 | Feigel |
| 2018/0334148 | A1* | 11/2018 | Feigel .................. B60T 13/662 |
| 2019/0031165 | A1 | 1/2019 | Besier et al. |
| 2019/0308601 | A1* | 10/2019 | Maj ........................ B60T 7/042 |
| 2019/0322261 | A1* | 10/2019 | Hienz .................... B60T 13/58 |
| 2019/0344769 | A1* | 11/2019 | Zimmermann ....... B60T 13/168 |
| 2020/0139949 | A1* | 5/2020 | Dolmaya ................ B60T 7/042 |
| 2020/0307538 | A1* | 10/2020 | Ganzel ................. B60T 8/4081 |
| 2020/0369252 | A1* | 11/2020 | Biller .................... B60T 13/686 |
| 2021/0053540 | A1* | 2/2021 | Besier ...................... B60T 8/17 |

FOREIGN PATENT DOCUMENTS

| | | |
|---|---|---|
| CN | 106458716 A | 2/2017 |
| DE | 102013217954 A1 | 3/2015 |
| DE | 102013223672 A1 | 5/2015 |
| DE | 102016201261 A1 | 7/2016 |
| DE | 102016203563 A1 | 9/2017 |
| GB | 2225397 A | 5/1990 |
| KR | 20130102059 A | 9/2013 |
| KR | 20169086936 A | 7/2016 |
| WO | 9839189 A1 | 9/1998 |

OTHER PUBLICATIONS

Korean Notification of Reason for Refusal for Korean Application No. 10-2020-7011722, dated Apr. 21, 2021, with translation, 18 pages.
International Search Report and Written Opinion with partial English translation for International Application No. PCT/EP2018/078859, dated Feb. 4, 2019, 13 pages.
International Search Report and Written Opinion for International Application No. PCT/EP2018/078859, dated Feb. 4, 2019, 19 pages (German).
Chinese Office Action for Chinese Application No. 201880069149.1, dated Oct. 9, 2021, with partial English translation, 12 pages.
Chinese Office Action for Chinese Application No. 201880089149.1, dated Mar. 8, 2022, with translation, 15 pages.

* cited by examiner

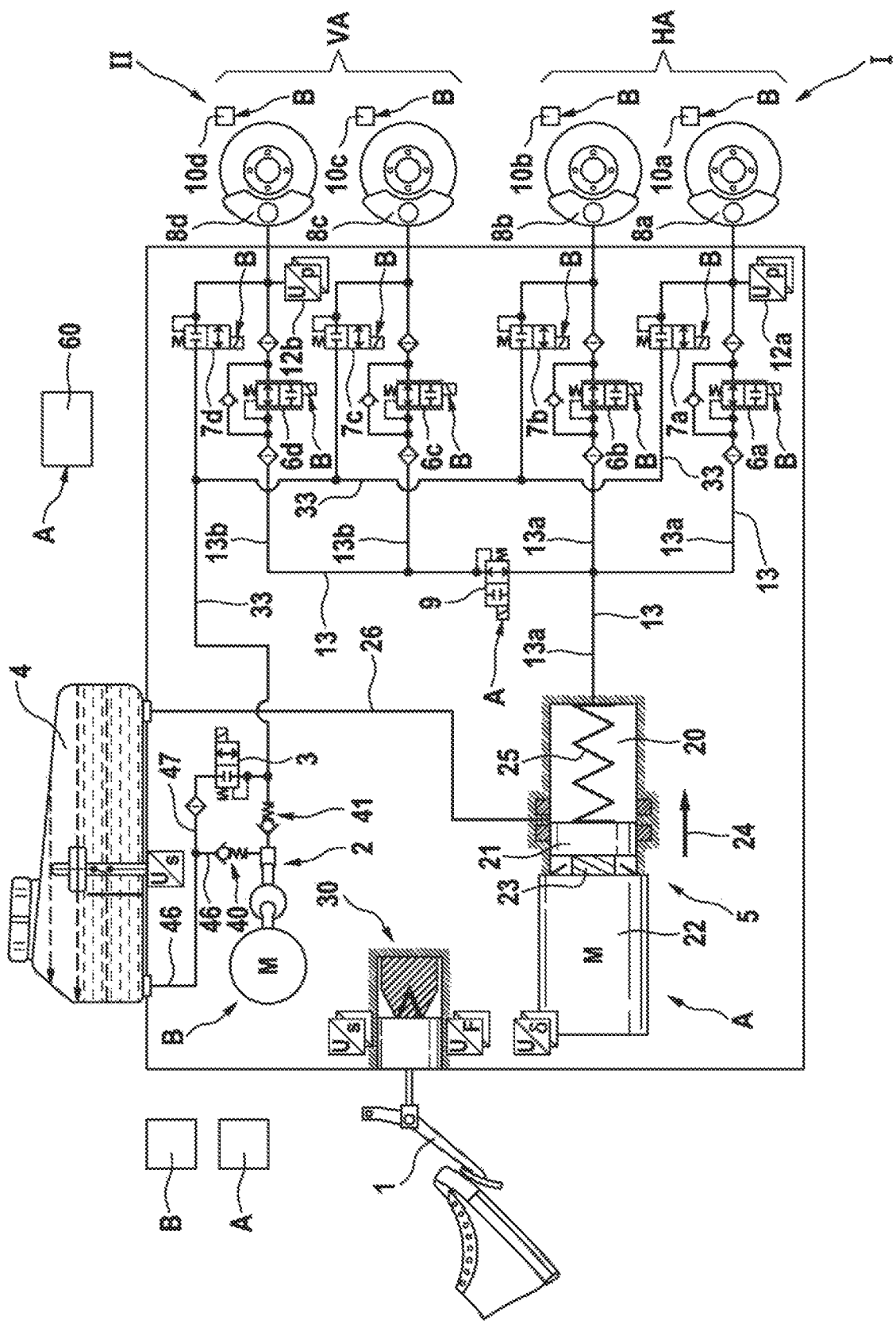

BRAKE SYSTEM AND METHOD FOR OPERATING SUCH A BRAKE SYSTEM

CROSS REFERENCE TO RELATED APPLICATIONS

This application is the U.S. National Phase Application of PCT International Application No. PCT/EP2018/078859, filed Oct. 22, 2018, which claims priority to German Patent Application No. 10 2017 219 000.0, filed Oct. 24, 2017, the contents of such applications being incorporated by reference herein.

FIELD OF THE INVENTION

The invention relates to a brake system and to a method for operating such a brake system.

BACKGROUND OF THE INVENTION

A generic brake system with two electrically controlled pressure sources for a motor vehicle with four hydraulically activated wheel brakes is known from DE 10 2013 217 954 A1, incorporated herein by reference. In said document, in order to actuate the wheel brakes in various operating modes, they are connected to the two electrically controlled pressure sources and also to a master brake cylinder which can be activated by brake pedal. The brake system comprises not only wheel-specific inlet and outlet valves which connect the wheel brakes to the pressure medium reservoir vessel but also a circuit isolating valve which is closed when de-energized and a total of four isolating valves for disconnecting the master brake cylinder and the electrically controlled pressure sources from the inlet valves. The circuit isolating valve basically disconnects the brake circuits, with the result that in the first brake circuit, brake pressure is built up exclusively by the first pressure source, and in the second brake circuit, brake pressure is built up exclusively by the second pressure source. The brake circuits are connected through the circuit isolating valve only if one of the two pressure sources is heavily impaired in respect of its function or fails. Furthermore, the brake system in 10 2013 217 954 A1 comprises a central open-loop and closed-loop control unit, a first open-loop and closed-loop control unit assigned to the first pressure source, and a second open-loop and closed-loop control unit assigned to the second pressure source.

The first and second open-loop and closed-loop control units each serve to control the corresponding pressure source. The circuit isolating valve is activated by means of the central open-loop and closed-loop control unit.

It is intended that a fallback level, in which the driver can activate the wheel brakes using muscle power, will be dispensed with in future brake systems, which are also to be suitable for highly automated driving. For this, and also for highly automated driving, the brake systems must also have sufficient availability and be embodied in a "fail-operational" fashion. This applies to a hydraulic fault, such as e.g. a leak, or to an electrical fault, such as e.g. a failure of an electrical energy source or a failure of an electronic actuation device.

SUMMARY OF THE INVENTION

An aspect of the present invention is a brake system with two electrically activated pressure sources as well as a method for operating such a brake system, which is suitable for highly automated or autonomously driving motor vehicles and has correspondingly sufficient availability. In this context, it is to be possible to manufacture the brake system cost-effectively.

An aspect of the invention is based on the concept that a first electrically activated wheel valve which is designed to be open when de-energized and a second electrically activated wheel valve which is designed to be closed when de-energized are provided for each of the wheel brakes, and that the first electrically activated pressure source is connected via a first brake supply line to the first wheel valves, which are designed to be open when de-energized, and the second electrically activated pressure source is connected via a second brake supply line to the second wheel valves which are designed to be closed when de-energized, wherein arranged in the first brake supply line is an electrically activated circuit isolating valve which is designed to be open when de-energized and by means of which two of the first wheel valves can be hydraulically disconnected from the first pressure source.

The circuit isolating valve permits demand-based division into two brake circuits with at least two wheel brakes each and therefore allows blending between the brake circuits. However, according to the principles involved, especially in the de-energized state of the brake system, the first electrically activated pressure source is connected, for the activation of the wheel brakes, to each of the wheel brakes via the respective first wheel valve which is designed to be open when de-energized. The second electrically activated pressure source is connected to each of the second wheel valves for the activation of the wheel brakes.

An advantage of the invention is that, despite a high level of availability in the event of hydraulic or electrical faults, in comparison with known brake systems with two electrically controlled pressure sources, fewer electrically activated valves are required and it is specifically possible to dispense with isolating valves arranged between the pressure sources and the wheel valves.

There is preferably no electrically activated valve arranged between the first pressure source and the other first wheel valves. There is particularly preferably no valve, that is to say also no nonreturn valve, arranged between the first pressure source and the other first wheel valves. This means that an isolating valve between the first pressure source and (all) the first wheel valves, as is known e.g. from DE 10 2013 217 954 A1, is dispensed with, which permits a saving in manufacturing costs.

There is preferably no electrically activated valve arranged in the second brake supply line, i.e. in the hydraulic connection between the second electrically activated pressure source and the second wheel valves. This saves costs and avoids unnecessary flow resistances between the pressure source and wheel valves. There is particularly preferably no valve, that is to say also no nonreturn valve, arranged in the second brake supply line. In other words, the second electrically activated pressure source is preferably connected directly to each of the second wheel valves. This means, on the one hand, that an electrically activated circuit isolating valve by means of which some of the corresponding (namely the first) wheel valves can be hydraulically disconnected from the corresponding pressure source (namely the first pressure source) is arranged in just one of the two brake supply lines (namely the first brake supply line). There is no circuit isolating valve arranged in the second brake supply line. However, this means that there is also no isolating valve provided between the second pressure source and (all) the second wheel valves.

The two first wheel valves which can be hydraulically disconnected from the first pressure source are preferably assigned to the wheels of a first vehicle axle, while the other first wheel valves are assigned to the wheels of another vehicle axle. The first vehicle axle is advantageously the front axle, and the other vehicle axle the rear axle.

According to one preferred development of the invention, the brake system comprises a first electronic device by means of which the first pressure source is activated, and a second electronic device by means of which the second pressure source is activated. In this context, the second electronic device is electrically independent of the first electronic device, with the result that an electrical or electronic fault in one of the electronic devices does not cause a failure of both electronic devices.

The two electronic devices are electrically independent of one another in the sense that a failure of the first electronic device does not cause a failure of the second electronic device and vice versa, i.e. the two electronic devices are electrically isolated.

The first electronic device is preferably supplied by a first electrical energy source, and the second electronic device is preferably supplied by a second electrical energy source, the first electrical energy source being independent of the second electrical energy source. It is alternatively preferred that the first electronic device comprises a first electrical energy source, and the second electronic device comprises a second electrical energy source, the first electrical energy source being independent of the second electrical energy source.

The two electronic devices can be arranged in a common housing or on a common printed circuit board, e.g. in a common electronic open-loop and closed-loop control unit (ECU). Alternatively, the two electronic devices can be arranged in two separate housings or on two separate printed circuit boards, e.g. in two electronic open-loop and closed-loop control units (ECU1, ECU2).

The first electronic device is designed to activate or actuate the first pressure source. The first pressure source is preferably also supplied with electrical energy by the first electronic device. Correspondingly, the second pressure source is activated or actuated by means of the second electronic device. The second pressure source is preferably also supplied with electrical energy by the second electronic device.

The first and second wheel valves are preferably activated by means of the second electronic device. Therefore, activation of the wheel brakes is possible even in the event of a failure of the first electronic device or of the first energy source in that by means of the second electronic device the second pressure source is actuated, the first wheel valves are closed and the second wheel valves are open. The first and second wheel valves are particularly preferably activated exclusively by means of the second electronic device so that more cost-intensive valves which can be actuated in a duplicate fashion do not have to be provided.

Preferably one wheel speed sensor is provided for each wheel brake, wherein the signals of the wheel speed sensors are fed to the second electronic device for evaluation. Therefore, in the event of a failure of the first electronic device a wheel-specific brake pressure closed-loop control process (e.g. slip control) can be carried out by means of the second electronic device. The wheel speed sensors are particularly preferably also supplied with electrical energy by the second electronic device.

The circuit isolating valve is preferably activated by means of the first electronic device. Therefore, in the event of a failure of the second electronic device or of the second energy source, and therefore of the possibility of actuating the wheel valves, pressure is made available by means of the first pressure source and at least circuit-based and/or axle-based blending is still carried out and/or circuit-based and/or axle-based different brake pressures are still set. The circuit isolating valve is particularly preferably activated by means of the first electronic device.

A vehicle movement dynamics sensor system is preferably provided, wherein the signals of the vehicle movement dynamics sensor system are fed to the first electronic device for evaluation, since the first pressure source, assigned to the first electronic device, for making available pressure is configured with maximum comfort and dynamics. The vehicle movement dynamics sensor system is particularly preferably also supplied with electrical energy by the first electronic device.

A pressure sensor of redundant design is preferably provided in each brake circuit in order to permit closed-loop control of the pressure in the brake circuit. The pressure sensor particularly preferably measures the wheel brake pressure of a wheel brake of the brake circuit.

A pressure sensor which is arranged between the first and second wheel valves of the wheel brake and is of redundant design is preferred for two of the wheel brakes.

At least the first pressure source is preferably embodied as a cylinder-piston assembly with a pressure space which is bounded by a piston which can be moved, by means of an electric motor and a rotational-translational transmission, in an activation direction to build up pressure and in the direction opposite to the activation direction in order to reduce pressure. Such pressure sensors can set chronological brake pressure profiles in a demand-based fashion and with high precision.

The cylinder-piston assembly is preferably embodied in such a way that in an unactivated state of the piston the pressure space is connected to the pressure medium reservoir vessel via at least one snifter hole, wherein this connection is interrupted when the piston is activated.

A resetting element, which positions the piston in the unactivated state when the electric motor is de-energized is preferably provided in the pressure space of the cylinder-piston assembly. The rotational-translational transmission is advantageously of a non-self-locking design for this purpose. Therefore, in the event of a failure of the first pressure source or of the first electronic device, the piston is positioned in the unactivated state, as a result of which the connection from the pressure space to the pressure medium reservoir vessel is open. During an anti-lock brake control process, pressure medium can then flow away via one of the first valves and the pressure space of the first pressure source to the pressure medium reservoir vessel via this connection, in order to carry out a reduction in pressure at the associated wheel brake. When the electric motor is de-energized, the resetting element particularly preferably positions the piston at a stop, counter to the activation direction.

According to one preferred embodiment of the invention, the second pressure source is embodied as a piston pump whose suction side is connected to the pressure medium reservoir vessel and whose pressure side is connected to the second pressure supply line, wherein an electrically activated isolating valve is connected hydraulically in parallel with the piston pump. This means that between the second pressure supply line and the pressure medium reservoir vessel there is a hydraulic connection in which the isolating valve is arranged. When the isolating valve is opened, pressure medium can be discharged from one of the wheel brakes via this connection and via the corresponding second wheel valve into the pressure medium reservoir vessel, so that, e.g. when making available pressure by means of the first pressure source, a reduction in pressure can be carried out at the corresponding wheel brake (e.g. for a wheel-specific pressure closed-loop control process). When pressure is made available by the piston pump, the isolating valve which is connected in parallel permits a pressure closed-loop control process through overflow. The isolating valve is particularly preferably designed to be closed when de-energized, in order to prevent unintentional flowing away of pressure medium into the pressure medium reservoir vessel.

The brake system preferably comprises a simulation device which can be activated by means of a brake pedal, wherein there is no mechanical and/or hydraulic operative connection provided between the brake pedal and the wheel brakes.

The invention also relates to a method for operating a brake system with two electrically activated pressure sources.

In the event of a failure of the first pressure source or of the first electronic device, the second electronic device is used to close the first wheel valves, open the second wheel valves and activate the second pressure source to build up a pressure. This is particularly preferably carried out during a normal braking process.

In the event of a failure of the first pressure source (5) or of the first electronic device, a wheel-specific brake pressure closed-loop control process is carried out by means of the second electronic device, wherein a reduction in pressure is carried out at one of the wheel brakes by opening the corresponding first wheel valve, wherein pressure medium flows away to the pressure medium reservoir vessel via the circuit isolating valve and the first pressure source.

In the event of a failure of the second pressure source or of the second electronic device, the first electronic device is preferably used to activate the first pressure source to build up a brake pressure and the circuit isolating valve to set circuit-specific brake pressures.

In a normal operating mode during a normal braking process, preferably only the first pressure source is actuated to build up a pressure to activate the wheel brakes. In this context, none of the valves (i.e. no first wheel valve, no second wheel valve, no circuit isolating valve) is activated.

A normal braking process is understood to be a braking process which is initiated by a driver or an autopilot function and during which the same brake pressure is applied to all the wheel brakes and no wheel-specific brake pressure closed-loop control process takes place.

In the normal operating mode, wheel-specific slip control is preferably carried out by actuating the first wheel valves and the second wheel valves, wherein a reduction in pressure is carried out at one of the wheel brakes by opening the corresponding second wheel valve and the isolating valve.

BRIEF DESCRIPTION OF THE DRAWINGS

Further preferred embodiments of the invention will emerge from the dependent claims and the following description with reference to a FIGURE.

The FIGURE schematically shows an exemplary embodiment of a brake system according to the invention.

DETAILED DESCRIPTION OF THE PREFERRED EMBODIMENTS

In the FIGURE, an exemplary embodiment of a brake system according to the invention for a motor vehicle with four hydraulically activated wheel brakes $8a$-$8d$ is illustrated schematically. The brake system comprises a first electrically controlled pressure source 5, a second electrically controlled pressure source 2, a pressure medium reservoir vessel 4 at atmospheric pressure, and a first electrically activated wheel valve $6a$-$6d$ (also referred to as an inlet valve) and a second electrically activated wheel valve $7a$-$7d$ (also referred to as an outlet valve) for each wheel brake $8a$-$8d$.

The first wheel valves $6a$-$6d$ are designed to be open when de-energized, and the second wheel valves $7a$-$7d$ are designed to be closed when de-energized. The first wheel valves $6a$-$6d$ are advantageously of analogized or analog-actuated design, in order to permit precise setting of the pressure at the wheel brakes $8a$-$8d$.

In order to activate the wheel brakes $8a$-$8d$, both the first electrically activated pressure source 5 and the second electrically activated pressure source 2 are connected in a hydraulically disconnectable fashion to each of the wheel brakes $8a$-$8d$. Therefore, the first pressure source 5 is connected to the first wheel valves $6a$-$6d$ via a first brake supply line 13, and the second pressure source 2 is connected to the second wheel valves $7a$-$7d$ via a second brake supply line 33.

Each of the wheel brakes $8a$-$8d$ is therefore assigned a first wheel valve $6a$-$6d$ which is designed to be open when de-energized and a second wheel valve $7a$-$7d$ which is designed to be closed when de-energized. In this context, the first electrically activated pressure source 5 is connected to the wheel brakes $8a$-$8d$ via the first wheel valves $6a$-$6d$ (or the first pressure source is connected to each of the wheel brakes via the respective first wheel valve) and the second electrically activated pressure source 2 is connected to the wheel brakes $8a$-$8d$ via the second wheel valves $7a$-$7d$ (or the second pressure source is connected to each of the wheel brakes via the respective second wheel valve). The brake system does not contain any further (wheel) valves which are assigned to the individual wheel brakes $8a$-$8d$.

At each wheel brake $8a$, $8b$, $8c$, $8d$, an output connection of the first wheel valve $6a$, $6b$, $6c$, $6d$ and an output connection of the second wheel valve $7a$, $7b$, $7c$, $7d$ are connected to one another and to the wheel brake.

The input connections of the second wheel valves $7a$-$7d$ are connected to the second pressure source 2 or its pressure space in a direct hydraulic fashion via the second brake supply line 33. The term "connected in a direct hydraulic fashion" is to be understood here in the sense that there is no electrically activated valve or even no valve at all (e.g. nonreturn valve) arranged in the second brake supply line 33. Therefore, there is no provision of either a second isolating valve for disconnecting the second pressure source from some of the wheel brakes or of an isolating valve for disconnecting the second pressure source from all the wheel brakes.

An electrically activated circuit isolating valve 9 which is designed to be open when de-energized is arranged in the first brake supply line 13. Two of the first wheel valves, specifically the wheel valves $6c$ and $6d$, can be hydraulically disconnected from the first pressure source 5 by the circuit isolating valve 9. In other words, the circuit isolating valve 9 is arranged in the first brake supply line 13 in such a way that when the circuit isolating valve is closed, the brake supply line 13 is hydraulically divided into a first line section $13a$ and a second line section $13b$, wherein the first line section $13a$ is connected to the first wheel valves $6a$ and $6b$, and the second line section $13b$ is connected to the other first wheel valves $6c$ and $6d$. The first line section $13a$ connects the first pressure source 5 to the first wheel valves 6a and 6b and to the circuit isolating valve 9, and the second line section 13b connects the circuit isolating valve 9 to the first wheel valves 6c and 6d. In this sense, when the circuit isolating valve 9 is closed, the brake system is divided into a first brake circuit I for the wheel brakes 8a and 8b and a second brake circuit II for the wheel brakes 8c and 8d.

The input connections of the first wheel valves 6a-6d are hydraulically connected to the first pressure source or its pressure space via the first brake supply line 13, wherein the input connections of the first wheel valves 6a and 6b (of the first brake circuit I) are connected to the first pressure source 5 or its pressure space in a direct hydraulic fashion, and the input connections of the first wheel valves 6c and 6d (of the second brake circuit II) are hydraulically connected to the first pressure source 5 or its pressure space via the circuit isolating valve 9.

There is a pressure sensor of redundant design for each brake circuit I, II. The pressure sensor 12a which is of redundant design and measures the pressure in the wheel brake 8a is connected between the wheel valve 6a and 7a. The pressure sensor 12b which is of redundant design and measures the pressure in the wheel brake 8d is connected between the wheel valve 6d and 7d.

The exemplary brake system comprises a wheel speed sensor 10a-10d, or is connected to such a sensor, for each wheel brake 8a-8d.

Furthermore, a vehicle movement dynamics sensor system 60 is provided, by means of which at least one, and preferably all, of the following variables are acquired: vehicle longitudinal acceleration, vehicle lateral acceleration, vehicle yawing rate and steering angle.

The brake system comprises two redundant electrical energy sources (e.g. vehicle electrical systems) or is connected thereto, said sources being referred to below as the first electrical energy source and second electrical energy source.

The brake system comprises a first electronic device A and a second electronic device B, the second electronic device B being electrically independent of the first electronic device A. The electronic devices A, B are electrically isolated. In the event of a fault in the first electronic device A, for example due to an electrical defect, the second electronic device remains fully functional.

The electronic device A comprises electrical and/or electronic components for controlling and activating the first pressure source 5 (indicated by the arrow with A in the FIGURE). Device A can be embodied, e.g. as a first electronic open-loop and closed-loop control unit or as a first part of an open-loop and closed-loop control unit.

The electronic device A can comprise the first electrical energy source, by means of which the device A itself and the pressure source 5 are supplied with energy, or device A is connected to the first electrical energy source (for example the first vehicle electrical system).

The first pressure source 5 can be supplied with energy directly from the first electrical energy source or from the device A (i.e. indirectly from the first electrical energy source).

The electronic device B comprises electrical and/or electronic components for actuating and activating the second pressure source 2 (indicated by the arrow with B in the FIGURE).

Device B can be embodied, e.g., as a second electronic open-loop and closed-loop control unit or as a second part of an electronic open-loop and closed-loop control unit.

The electronic device B can comprise the second electrical energy source, by means of which the device B itself and the pressure source 2 are supplied with energy, or device B is connected to the second electrical energy source (e.g. the second vehicle electrical system). In any case, for sufficient availability of the brake system, it is advantageous that the second electrical energy source is independent of the first energy source.

The second pressure source 2 can be supplied with energy directly by the second electrical energy source or by the device B (i.e. indirectly by the second electrical energy source).

The first wheel valves 6a-6d, like the second wheel valves 7a-7d, are activated by means of the second electronic device B (indicated by the arrows with B in the FIGURE). For example, the wheel valves cannot be activated by means of the first electronic device A, i.e. the second wheel valves are activated exclusively by means of the second electronic device B.

The circuit isolating valve 9 is activated by means of the first electronic device A (indicated by the arrow with A in the FIGURE). For example, the circuit isolating valve cannot be activated by means of the electronic device B, i.e. the circuit isolating valve is activated exclusively by means of the first electronic device A.

The signals of the wheel speed sensors 10a-10d are fed to the second electronic device B for evaluation (indicated by the arrows with B in the FIGURE). The wheel speed sensors 10a-10d can be supplied with electrical energy by the second electronic device B.

The signals of the vehicle movement dynamics sensor system 60 are fed to the first electronic device A for evaluation (indicated by the arrow with A in the FIGURE). The vehicle movement dynamics sensor system 60 can be supplied with electrical energy by the first electronic device A.

For example, the first pressure source 5 is formed by what is referred to as a linear actuator (cylinder-piston assembly). For this purpose, the pressure source 5 has an electric motor 22, the rotational movement of which is converted by means of a schematically indicated rotational-translational mechanism 23 into a translational movement of a piston 21, which is moved in an activation direction 24 into a hydraulic pressure chamber 20 in order to build up pressure. To reduce the pressure, the piston 21 is moved in the direction opposite to the activation direction 24.

The pressure space 20 of the first pressure source 5 is hydraulically connected to the first brake supply line 13 independently of the activation state of the piston 21.

The pressure space 20 is also connected, in an unactivated state of the piston 21, to the pressure medium reservoir 4 via one or more snifter holes and a return line 26. The connection between the pressure space 20 and the return line 26 (and therefore the pressure medium reservoir vessel 4) is disconnected when there is (sufficient) activation of the piston 21 in the activation direction 24.

So that there is a hydraulic connection between the pressure space 20 and the pressure medium reservoir vessel 4 in a non-energized state of the electric motor 22, a resetting element 25, e.g. a compression spring, is provided in the pressure space 20, which resetting element 25 positions the piston 21 in the unactivated state, e.g. at a stop counter to the activation direction, when the electric motor 22 is de-energized. In order to permit this, the rotational-translational transmission 23 is not configured in a self-locking fashion.

Therefore, when the electric motor 22 is not energized (and the first wheel valves 6a-6d are not energized) the wheel brakes 8a-8d are connected to the pressure medium reservoir vessel 4 with the effect of pressure equalization. Therefore, e.g. brake pressure can be reduced in the wheel brakes 8a-8d.

For example, the second pressure source 2 is embodied as a piston pump (e.g. radial piston pump). The suction side 40 of the piston pump is connected to the pressure medium reservoir vessel 4 via an intake line 46. The pressure side 42 of the piston pump is connected to the second brake supply line 33, and therefore to the second wheel valves 7a-7d. A nonreturn valve which closes in the direction of the pressure medium reservoir vessel 4 is provided at or before the suction port of the piston pump. A nonreturn valve which opens in the direction of the brake supply line 33 is provided at or before the pressure port of the piston pump. The above-mentioned nonreturn valves are usually part of the piston pump.

An isolating valve 3 which is closed when de-energized and is used to perform closed-loop control of the pressure of the piston pump by means of overflow is advantageously connected hydraulically in parallel with the piston pump. For example, a hydraulic connection 47 is provided between the brake supply line 33 and the intake line 46 in which the isolating valve 3 is arranged.

The piston pump and the isolating valve 3 are, for example, activated exclusively by means of the second electronic device B.

Instead of the unit composed of the piston pump with the isolating valve 3, it is also possible to use a second linear actuator as a second pressure source.

The exemplary brake system in the FIGURE advantageously comprises in total only ten solenoid valves 6a-6d, 7a-7d, 3, 9.

For example, the wheel brakes 8a and 8b are assigned to one of the vehicle axles (e.g. the rear axle HA) and the wheel brakes 8c and 8d of the other vehicle axle (e.g. of the front axle VA).

The invention makes available a redundant brake system which is particularly suitable for future vehicles for implementing highly automated driving functions. The exemplary brake system is able to implement autonomous braking requests. Even after serious faults, such as for example a power failure of a primary vehicle electrical system, the exemplary brake system is able to continue to perform the following most important residual braking functions (primary functions) of a brake system autonomously or under control by autopilot:
  increasing deceleration,
  maintaining the blocking sequence of the axles in order to avoid veering off of the rear of the vehicle even when cornering,
  maintaining steerability in order to enable the (auto)pilot to perform evasive maneuvers even when braking.

For example, a hydraulic brake system is proposed which contains two electrically activated pressure sources, a wheel pressure modulation group composed of first and second wheel valves and at least one additional valve which is necessary or helpful for the connection. The brake system does not comprise a hydraulic fallback level, but instead comprises permanent hydraulic decoupling of the driver (brake pedal 1). The brake pedal is solely coupled to simulation device 30.

The exemplary brake system n comprises a first (primary) pressure source 5 which is embodied as a linear actuator (cylinder-piston assembly), and a second (secondary) pressure source 2 which comprises a radial piston pump as well as eight wheel (closed-loop control) valves 6a-6d, 7a-7d.

The radial piston pump is assigned an isolating valve 3, which is closed when de-energised, as an overflow valve, the actuation of which can bring about pressure limitation and a reduction in pressure.

The exemplary brake system provides the advantage that for the first pressure source it is possible to dispense with an isolating valve (also referred to as a sequence valve), since the second pressure source is connected to the wheel brakes via the second wheel valves which are closed when de-energized.

The first pressure source 5 is the high-performance pressure regulator which carries out normal braking processes in the most comfortable and dynamic manner in the system when it is free of faults.

During a normal braking process in the "by-wire-operating mode" (in particular in the fault-free system operating mode) no valves are connected and the wheel brakes 8a-8d are coupled hydraulically to the first pressure source 5 in a "single-circuit" fashion via the first valves 6a-6d (and the circuit isolating valve 9 which is open when de-energized). The buildup of pressure in the pressure space 20 occurs as result of moving over the snifter hole with the piston 21.

Method for operating the exemplary brake systems are described below.

If one of the two pressure sources 2, 5 fails because of a fault (for example because of a power failure of the vehicle electrical system), the respective other pressure sources 5, 2 can still activate all the wheel brakes 8a-8d.

The following closed-loop control strategies are carried out for a residual braking function after a fault.

In the event of failure of the first energy source or of the first electronic device:

The second electronic device B (or the second electrical energy source) of the second pressure source 2 are also assigned the wheel valves 6a-6d, 7a-7d, i.e. they are activated by the device B and/or supplied by the second energy source. Likewise, the wheel speed sensors and/or the signal detections thereof are assigned to the second electronic device B (or to the second electrical energy source). The second electronic device B can then carry out without modification anti-lock brake control processes or wheel-specific closed-loop control functions which are known per se and, together with the possibility of building up brake pressure (by means of pressure source 2), can perform all the residual braking functions.

During the wheel-specific closed-loop control process, the second wheel valves 7a-7d (closed when de-energized) are operated as inlet valves, and the first wheel valves 6a-6d (open when de-energized) are operated as outlet valves.

In the event of failure of the second energy source or of the second electronic device:

The first electronic device A (or the first electrical energy source) are assigned the first pressure source 5 and the circuit isolating valve 9, as well as the entire vehicle movement dynamics sensor system 60 (e.g. for the detection of longitudinal acceleration, lateral acceleration, yawing rate and steering angle signal).

In addition to building up the pressure, the pressure source 5 can still perform closed-loop control of the pressure centrally with very high dynamics and accuracy. The circuit isolating valve 9 (and the possibility of activating it) even permits different pressures to be able to be set on a brake circuit basis or axle basis. This is carried out according to an axle multiplex method. The efficiency of this closed-loop control strategy is not at the level of the fault-free system in terms of braking performance. However, it is sufficient to ensure the residual brake functions for the described fault situation.

The invention claimed is:

1. A brake system for a motor vehicle with at least four hydraulically activated wheel brakes, comprising:
   for each of the wheel brakes a first electrically activated wheel valve which is designed to be open when de-energized and a second electrically activated wheel valve which is designed to be closed when de-energized,
   a first electrically activated pressure source, which is connected to each of the first electrically activated wheel valves via a first brake supply line, wherein arranged in the first brake supply line is an electrically activated circuit isolating valve by means of which two of the first electrically activated wheel valves can be hydraulically disconnected from the first pressure source,
   a second electrically activated pressure source, and
   a pressure medium reservoir vessel which is at atmospheric pressure,
   wherein
   the circuit isolating valve is designed to be open when de-energized, and the second electrically activated pressure source is connected to each of the second electrically activated wheel valves via a second brake supply line such that the second electrically activated pressure source is connected via each of the second electrically activated wheel valves to a respective one of the wheel brakes,
   the brake system comprises a first electronic device by which the first pressure source is activated, and a second electronic device by which the second pressure source is activated, the second electronic device being electrically independent of the first electronic device,
   the first and second electrically activated wheel valves are activated exclusively by the second electronic device, and
   the circuit isolating valve is activated exclusively by the first electronic device.

2. The brake system as claimed in claim 1, wherein there is no electrically activated valve arranged between the second pressure source and the second electrically activated wheel valves in the second brake supply line.

3. The brake system as claimed in claim 1, wherein there is no valve arranged between the first pressure source and the first electrically activated wheel valves.

4. The brake system as claimed in claim 1, wherein a wheel speed sensor is provided for each wheel brake, wherein the signals of the wheel speed sensors are fed to the second electronic device for evaluation, and the wheel speed sensors are supplied with electrical energy by the second electronic device.

5. The brake system as claimed in claim 1, further comprising a vehicle movement dynamics sensor system, wherein the signals of the vehicle movement dynamics sensor system are fed to the first electronic device for evaluation, and the vehicle movement dynamics sensor system is supplied with electrical energy by the first electronic device.

6. The brake system as claimed in claim 1, wherein at least the first pressure source is embodied as a cylinder-piston assembly with a pressure space which is bounded by a piston which can be moved, by an electric motor and a rotational-translational transmission, in an activation direction to build up pressure and in a direction opposite to the activation direction in order to reduce pressure.

7. The brake system as claimed in claim 6, wherein in an unactivated state of the piston the pressure space is connected to the pressure medium reservoir vessel via at least one snifter hole, wherein this connection is interrupted when the piston is activated.

8. The brake system as claimed in claim 6, wherein a resetting element, which positions the piston in the unactivated state when the electric motor is de-energized, is provided in the pressure space.

9. The brake system as claimed in claim 1, wherein said brake system further comprises a simulation device which can be activated by a brake pedal, wherein no mechanical and/or hydraulic operative connection between the brake pedal and the wheel brakes is provided.

10. A method for operating a brake system as claimed in claim 1, wherein in the event of a failure of the first pressure source or of the first electronic device, the first electrically activated wheel valves are closed by the second electronic device and the second electrically activated wheel valves are opened and the second pressure source is activated to build up a pressure.

11. The method as claimed in claim 10, wherein in the event of a failure of the first pressure source or of the first electronic device a wheel-specific brake pressure closed-loop control process is carried out by the second electronic device, wherein a reduction in pressure is carried out at one of the wheel brakes by opening the corresponding first electrically activated wheel valve, wherein pressure medium flows away to the pressure medium reservoir vessel via the circuit isolating valve and the first pressure source.

12. The method for operating a brake system as claimed in claim 10, wherein in the event of a failure of the second pressure source or the second electronic device the first pressure source is activated by the first electronic device to build up a brake pressure, and the circuit isolating valve is activated to set circuit-specific brake pressures.

13. The brake system as claimed in claim 1, wherein there is no valve arranged between the second pressure source and the second electrically activated wheel valves in the second brake supply line.

14. The brake system as claimed in claim 2, wherein there is no valve arranged between the first pressure source and the first electrically activated wheel valves.

15. The brake system as claimed in claim 7, wherein a resetting element, which positions the piston in the unactivated state when the electric motor is de-energized, is provided in the pressure space.

16. The method for operating a brake system as claimed in claim 11, wherein in the event of a failure of the second pressure source or the second electronic device the first pressure source is activated by the first electronic device to build up a brake pressure, and the circuit isolating valve is activated to set circuit-specific brake pressures.

* * * * *